FIG. 8

United States Patent Office 3,301,694
Patented Jan. 31, 1967

3,301,694
PRODUCTION OF FURNACE CARBON BLACK
HAVING PROPERTIES APPROXIMATING
THOSE OF CHANNEL CARBON BLACK
Gerard Kraus, Bartlesville, Okla., and Yuan C. Fu, Los
Angeles, Calif., assignors to Phillips Petroleum Company, a corporation of Delaware
Filed July 27, 1964, Ser. No. 386,483
5 Claims. (Cl. 106—307)

This is a continuation-in-part of our application Serial No. 201,664, filed June 11, 1962, now abandoned.

This invention relates to the production of carbon black. In one aspect this invention relates to the production of oil furnace carbon blacks having lower than normal properties of structure, pH and modulus imparted to rubber. In still another aspect this invention relates to a combination of steps applied to the production of oil furnace carbon blacks so that the carbon blacks produced have properties approximating those of channel blacks.

For several years carbon black has been produced in large quantities from oil feedstocks in carbon black producing furnaces. Prior to the advent of the furnace carbon blacks the major portion of the carbon black was produced by the channel process. The larger part of the carbon black produced today is used as a reinforcing agent for rubber. By far the larger part of the compounded rubber material containing carbon black is designed specifically for tire treads or tire carcasses. This rubber compounding art has advanced to a state such that the quality of the carbon black used in the compounding must be controlled within narrow limits. Control of all of the desired properties of the carbon black is oftentimes difficult to achieve.

Despite the widespread and increasing use of oil furnace blacks in applications formerly served by channel black, there are some uses for which channel blacks are still regarded as superior by some persons skilled in the art, for example, in tires in heavy duty, off-the-road service and other specific applications. It is therefore desirable to furnish the art with an oil furnace black exhibiting properties in rubber comparable to those provided by channel black. This is particularly true in view of the fact that channel blacks are gradually increasing in cost because of the increasing cost of the raw gas materials from which they are made and because of the inefficiency of the channel black process.

In controlling the quality of carbon blacks which are to be compounded into rubber, one important property of the finished rubber product is that of modulus. Carbon black has a marked influence on the modulus of the finished rubber product and therefore carbon blacks are commonly referred to in the art as "high modulus" carbon black or "low modulus" carbon black, as though "modulus" were a property of the carbon black itself. Strictly speaking, modulus is not a property of the carbon black but because of the general usage of this term in defining certain carbon blacks the terms "high modulus carbon black," "low modulus carbon black," or "intermediate modulus carbon black" as hereinafter employed will refer to the property of the rubber in which such carbon black is incorporated. Generally speaking, furnace carbon blacks are usually considered to be high modulus and channel blacks are generally considered to be low modulus although some furnace carbon blacks display properties of modulus in rubber which can cause them to be identified as either intermediate modulus or low modulus carbon blacks.

Another important property of carbon black is referred to as "structure" and although there is usually a close correlation between the structure of a carbon black and the modulus of a rubber product compounded with such carbon black, the terms cannot be considered synonymous because it is possible to vary the modulus of a finished rubber product even though the structure of the carbon black compounded therewith is the same or substantially the same. Other properties being comparable, high structure carbon blacks usually yield high modulus rubber and low structure carbon blacks usually yield low modulus rubber.

By the term "structure," as applied herein to carbon black, is meant the characteristics of the carbon black particles which relate to flocculation of such particles. The structure is said to be high when there is a strong tendency for the particles to form chains of particles. Conversely, the structure is said to be low when there is little tendency to form such chains.

Since it is not convenient to measure the structure directly, the oil absorption properties of the black are commonly used as a measure of the structure. Determination of oil absorption gives a quick, reliable measure of the structure of the carbon black. It has been found that the oil absorption of the carbon black usually correlates closely with certain properties such as modulus of a rubber having the carbon black compounded therein. It is thus possible to obtain a rapid measure of important properties of a carbon black insofar as rubber compounds compared with said carbon black are concerned. Furnace carbon blacks usually have an oil absorption value of about 1.35 to 1.45, or higher, cc. of oil per gram of carbon black and such carbon blacks are generally considered to be "high structure" carbon blacks. Carbon blacks made by the channel black process usually have an oil absorption value of about 0.75 to 1.2 cc. of oil per gram of carbon black and such carbon blacks will be hereinafter considered to be "low structure" carbon blacks or "relatively low structure" carbon blacks. Large particle size carbon blacks such as those made by the thermal process have an oil absorption value of about 0.45 to 0.55 cc. of oil per gram of carbon black; however, such carbon blacks are generally not considered so far as tire manufacture is concerned.

The pH of the carbon black is still another important property. It is known that treatment of the surface of a carbon black with an oxidizing gas can change the properties of the carbon black with respect to its pH and to the relative amounts of volatile matter and oxygen associated with the carbon black. Furnace carbon blacks are generally characterized by having a higher pH value and lesser amounts of oxygen and volatile matter associated therewith than do the channel carbon blacks. Reducing the values of modulus and structure of a furnace carbon black provides certain advantages in the finished rubber product but does not produce a carbon black equivalent to, or approximating, channel black because of differences in surface chemistry of the blacks. We have found that the improvement in rubber properties as a result of producing furnace carbon black having lower than normal properties of modulus and structure can not only be retained but is, the fact, benefited while at the same time the desirable properties of channel blacks can be realized by treating the carbon black with ozonized air at a temperature below about 480° F. or with nitric acid during the pelleting step. According to our invention the pH of the carbon black is reduced from a value greater than 9 to a value below 6 and the oxygen and volatile matter content of the furnace black are simultaneously increased. Thus, by a combination of steps which include producing furnace carbon black having lower than normal properties of modulus and structure and then treating such carbon black with ozone or nitric acid, we produce a furnace carbon black having properties which approximate those of channel black.

Furnace carbon blacks having lower than normal properties of modulus and structure can be produced by incorporating a metal, particularly an alkali metal, such as potassium into the hydrocarbon feed to the carbon black furnace. Other alkali metals such as rubidium and cesium can also be utilized to produce the so-called low structure furnace blacks although potassium, in elemental form or as any potassium compound, is preferred because of its greater effect upon the carbon black produced and because it can be used in extremely small amounts to produce the desired result. Thus alkali metals having an atomic number of at least 19 can be used. The alkali metals can be used in any form, as is well known, and are generally added along with the reactant hydrocarbon in an amount of at least 1 part by weight per million parts of carbon black produced. Other known methods of producing relatively low structure furnace carbon blacks include selection of proper feed stock, use of special oil sprays and spray angle, and other special processing means applied to the carbon black producing furnace.

It is an object of this invention to produce a furnace carbon black having properties approximately those of a channel carbon black. It is also an object of this invention to provide a method for producing a furnace carbon black having lower than normal properties of modulus, structure and pH. A further object of this invention is to provide a means for reducing the pH of a furnace carbon black in a more efficient manner than has been done in the prior art. Still another object of the invention is to provide compounded rubber products having increased resistance to tearing. Other objects, advantages and features of this invention will become apparent to one skilled in this art upon study of the disclosure including the detailed description of the invention and the appended drawing wherein:

Broadly, our invention contemplates the modification of furnace carbon blacks so as to simulate channel carbon blacks, particularly with respect to properties which benefit the carbon black for use in compounding rubber. More particularly our invention is directed to a combination of steps which comprises producing a furnace carbon black having lower than normal structure and treating such low structure carbon black with nitric acid or with an ozone-containing gas at a temperature between about atmospheric and about 250° C. so as to reduce the pH to a value below about 6. Furnace carbon blacks produced according to the process of our invention are characterized by an oil absorption value (structure) of not more than about 1; and a pH value of not more than about 5.

We have found that treatment of low structure furnace carbon black (e.g., blacks made in the presence of an alkali metal) with nitric acid at temperatures in the range of about atmospheric to 250° C., particularly between about 60 and 210° C. provides a furnace black that is a satisfactory substitute for channel black for use in rubber compounding, ink manufacture and other applications where channel black is indicated. The nitric acid treatment is advantageously incorporated into the wet pelleting step by adding the nitric acid to the pelleting liquid. The pelleting step is followed by a drying step.

In the pelleting step the loose carbon black is introduced into the pelleter at a temperature in the range of atmospheric to about 95° C. The temperature of the black is not critical except that it must be below the boiling point of water. The wet pellets exit the pelleter at a temperature in the range of about 85 to 95° C. The temperature of the exiting pellets can be controlled by controlling the temperature of the pelleting liquid or by other conventional means. The pelleting liquid which comprises an aqueous solution of nitric acid, e.g., a 6 to 9 weight percent solution of nitric acid is introduced at a temperature in the range of about atmospheric temperature to about 70° C. A temperature of about 60° C. is commonly utilized.

The wet pellets exiting the pelleter are passed to a rotary dryer which is heated by a number of burners. The wet pellets can be weighed and polished in passing from the pelleter to the dryer by well known means.

The wet pellets are heated in the dryer to a temperature sufficient to drive the moisture from them and they exit the dryer at a temperature of about 150 to 210° C. A dryer suitable for use in the practice of the present invention is described in U.S. Patent 3,013,785 issued December 19, 1961 to W. R. King. It is preferred that the pellet dryer exit temperature never exceed about 260° C. and it is advantageous to utilize an alarm in connection with the dryer so that the alarm be sounded if the pellet dryer exit temperature exceeds a selected temperature below 260° C.

The purge gas removed from the dryer will contain some quantity of nitrogen oxides which may or may not have sufficient value to justify their recovery. The purge gas can be scrubbed with water to recover the nitrogen oxides or can be disposed of in any convenient manner.

We have also found that treatment of the low structure furnace blacks with ozone at temperatures below 250° C., particularly between about 100° C. and 200° C., provides benefits which cannot be achieved with oxygen at similar reaction times and cannot be achieved with ozone at other temperatures. The beneficial effects of ozone can be realized at temperatures below about 100° C., e.g., at ambient temperature; however, greater amounts of ozone are required. At temperatures above about 250° C., e.g., at about 300° C., the pH of the black cannot be reduced to below about 6 regardless of the amount of ozone used or the length of reaction time. Treatment of low structure furnace carbon black with an oxygen-containing gas, e.g., air, at temperatures of about 400° C. failed to reduce the pH to a value below 7 at comparable reaction time. It is known that a considerable amount of carbon black is lost in side reactions when furnace carbon black is oxidized with oxygen or air. We have found that there is substantially no loss of carbon black when furnace carbon black is ozonized according to the process of our invention. Furthermore, the characteristics of ozonized furnace carbon black differ from those of air oxidized furnace carbon black in several respects. In general, when the pH values of air oxidized furnace black and ozonized furnace black are the same or substantially the same, the oxygen content and volatile matter content of the ozonized black are lower than those of the air oxidized black. This is believed to be because a considerable amount of the oxygen complexes in the air oxidized furnace black are nonacidic or only weakly acidic groups.

It is also a feature of a less preferred but valuable embodiment of our invention that furnace carbon black having rubber compounding and processing properties approximating those of channel black can be produced by ozonizing loose, low structure furnace carbon black at relatively low temperatures, with substantially no loss of carbon black. The steps of heating and handling large quantities of air, or other oxygen-containing gas, and the necessity for equipment for such steps are avoided by practice of the process of our invention.

In the figures of the drawing various conventional items such as valves, motors, pumps, meters, and the like, have been omitted so as to simplify the presentation of the invention. Those skilled in the art will have no difficulty in supplying such items of equipment.

Figure 1:
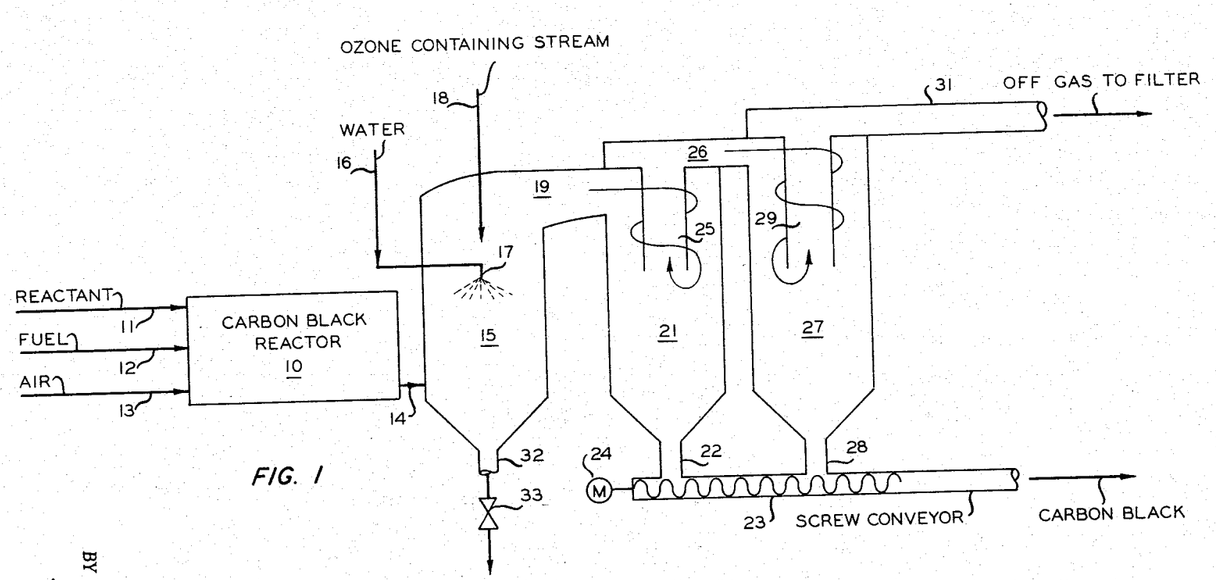
FIGURE 1 is a schematic flow diagram of one embodiment of the process of the invention for the ozone treatment of low structure furnace black and a means for carrying out the process.

Referring now to FIGURE 1, carbon black reactor or furnace 10, as hereinbefore described, is supplied with reactant hydrocarbon via conduit 11; KCl via conduit 11a; fuel via conduit 12; and air via conduit 13. The reaction products exit the reactor 10 via conduit 14 in the form of smoke which passes into chamber 15 and is therein quenched with water introduced via conduit 16 and spray means 17. The carbon black-containing stream, cooled to a temperature below about 250° C., is contacted with an ozone-containing stream introduced via conduit 18. The resulting mixture is passed via passageway 19 tangentially into separator means 21 wherein carbon black drops out of suspension and passes via conduit 22 to screw conveyor 23 operated by motor 24. Gas, still containing some carbon black in suspension, passes out of chamber 21 via stack 25 and is introduced via passageway 26 tangentially into separator chamber 27. Additional carbon black is dropped out of suspension in separator chamber 27 and passes via conduit 28 to screw conveyor 23 for removal to a pelleting mill or storage. Gases substantially depleted of carbon black are removed from separator chamber 27 via stack 29 and passed via conduit 31 to a filtering means (not shown).

Figure 2:
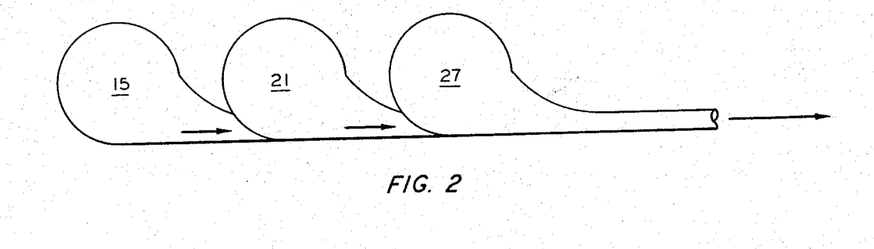
FIGURE 2 is a plan view of the principal vessels of FIGURE 1.

FIGURE 2 is a diagrammatic plan view of vessels 15, 21 and 27, illustrating the tangential introduction of the gases to the vessels.

Figures 3, 4, 5:
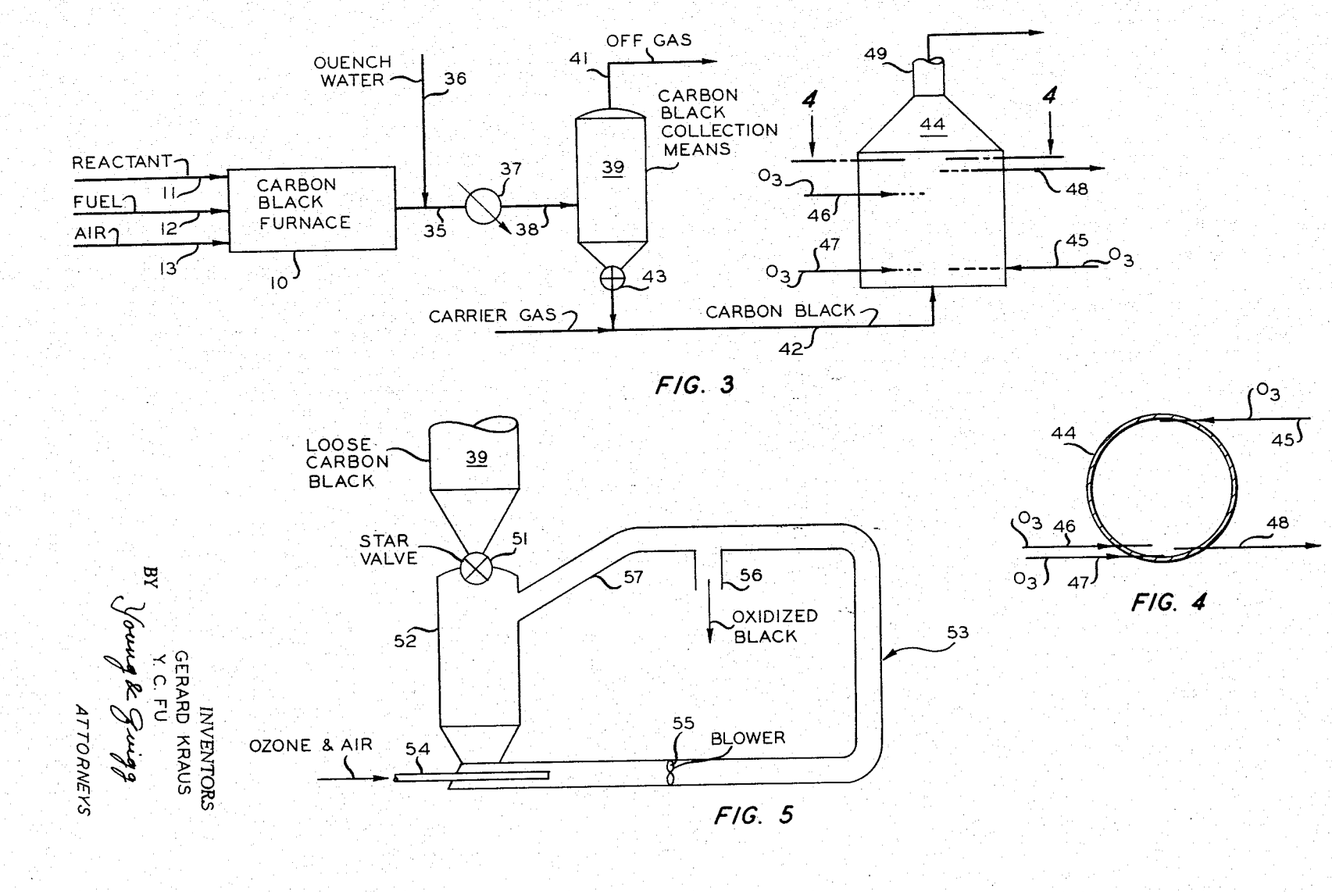
FIGURE 3 is a schematic flow diagram of a preferred process for the ozone treatment of the invention and one embodiment of a means for carrying out the process.
FIGURE 4 is a view along lines 4—4 of FIGURE 3.
FIGURE 5 is a diagrammatic illustration of another embodiment of a means for carrying out the process of FIGURE 3.

A preferred method of ozonizing carbon black is illustrated in FIGURE 3 wherein the effluent from the carbon black furnace 10 is quenched in conduit 35 by water admitted via conduit 36 and is further cooled in heat exchanger 37 after which it passes via conduit 38 to carbon black collecting means 39 which can be a bag filter or equivalent means. Off gas is removed via conduit 41 and carbon black is removed via conduit 42 at a temperature below about 250° C. and passed by a regulating means such as a start valve 43 to a chamber 44 wherein an oxidizing gas such as an ozone-containing stream is admitted tangentially through a plurality of inlets indicated at 45, 46 and 47 and a mixture of gases and carbon black are removed via conduit 48 to a gas-carbon black separation means (not shown). Off gases are removed via stack 49. This method, whereby the carbon black is treated after being separated from the combustion gases and steam from the quench, is the preferred method because a smaller quantity of ozone is required to achieve the desired reduction in pH and the ozone-containing stream can be the carrier gas for the carbon black so that the total amount of gas handled by the system is not increased.

The tangential introduction of the gases is illustrated in FIGURE 4.

FIGURE 5 illustrates an alternative method of ozonizing the loose carbon black collected in vessel 39 of FIGURE 3. Carbon black is passed by means of a regulating device such as star valve 51 from collection means 39 into a leg 52 of a loop reactor 53 into which is introduced an oxidizing gas, such as ozone and air, via conduit 54. Circulation through the loop reactor 53 is accomplished by means such as blower 55 and a stream containing oxidized carbon black is removed via conduit 56, the remainder of the stream being recycled via section 57 of the loop reactor 53.

Figures 6, 7:
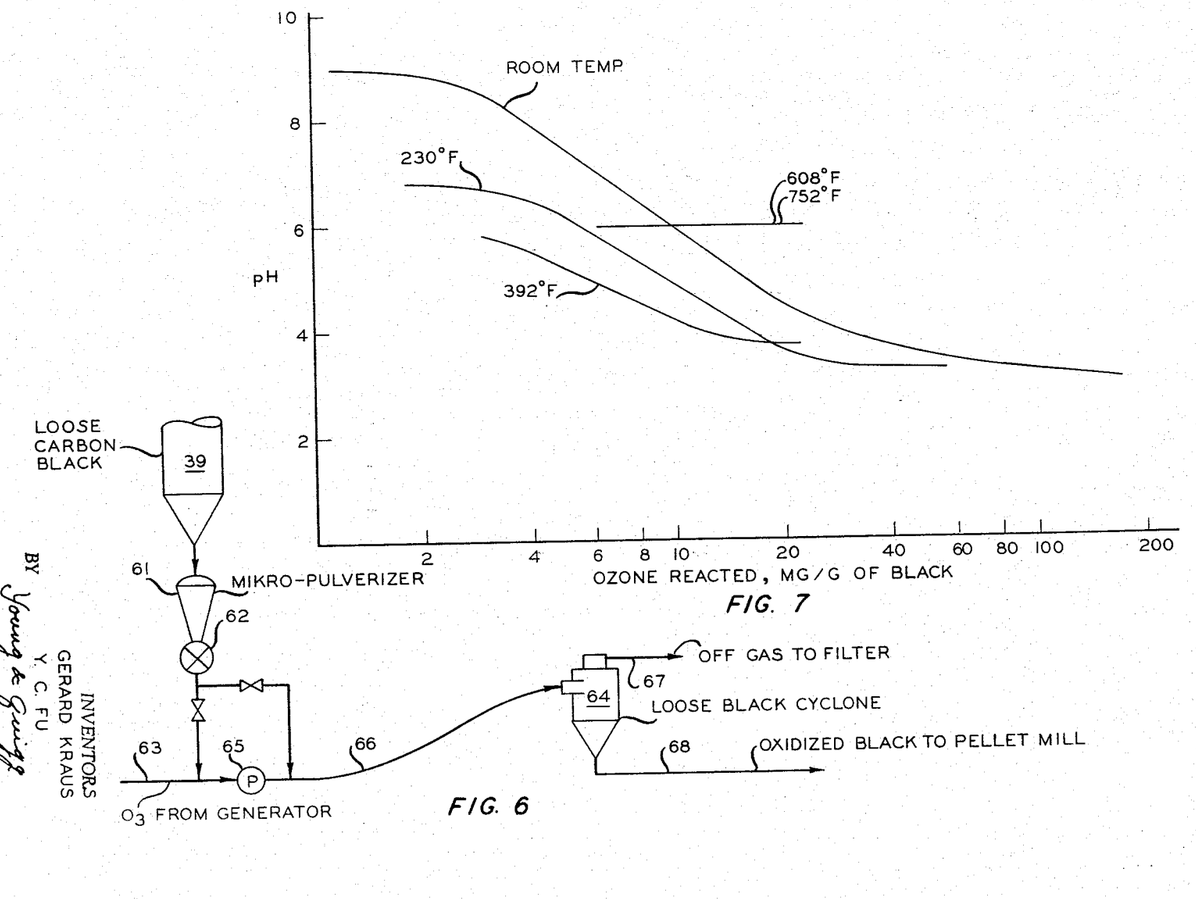
FIGURE 6 is a diagrammatic illustration of a preferred modification of the means of FIGURE 3.
FIGURE 7 represents a family of curves showing the efficiency of the ozone treatment at various temperatures.

FIGURE 6 illustrates a preferred embodiment of the invention with respect to the steps for ozonizing the loose carbon black removed from the collection means 39 of FIGURE 3. In the embodiment of FIGURE 6 the carbon black is passed to a Mikro-Pulverizer 61 and thence through a regulating means such as star valve 62 into conduit 63 which contains an ozonizing gas such as a mixture of ozone and air being passed from an ozone generator to a gas-carbon black separating means 64 via pump or blower 65 and conduit 66. Off gas from separator 64 passes via conduit 67 to a filter (not shown) and oxidized carbon black passes via conduit 68 to further processing such as a pelleting operation or storage. The ratio of ozone to carbon black can be maintained substantially constant by controlling the ozone output of the ozone generator with respect to the output of the star valve following the Mikro-Pulverizer. If the supply of carbon black to conduit 66 is constant or substantially constant, the voltage to the ozone generator can be controlled manually. If the supply of carbon black is variable, the voltage on the ozone generator can be controlled by the rotation of the star valve following the Mikro-Pulverizer. For example, the star valve can operate a ball-governor, the sliding sleeve of which can be mechanically linked to a variable transformer to control the voltage on the ozone generator. Alternatively, the rotation of the star valve, or other metering device, can be utilized to generate a voltage proportional to rotational speed, which voltage is applied to a multiplying circuit to control the voltage on the ozone generator. Circuitry and equipment for such measurements are known. In case the carbon black is measured by weigh belt the ratio control can be connected to the weigher of the weigh belt.

Figure 8:
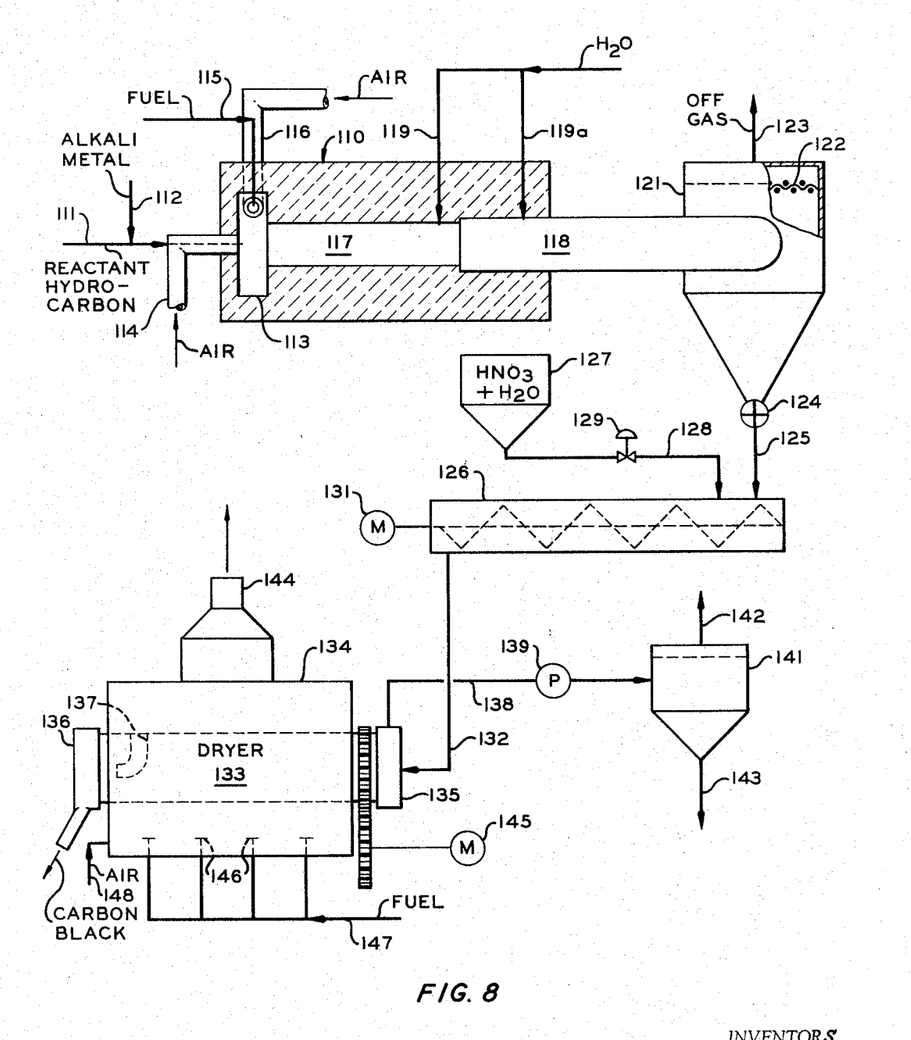
FIGURE 8 is a schematic flow diagram of one embodiment of the process of the invention for the nitric acid treatment of low structure furnace black and means for carrying out the process.

Referring now to FIGURE 8, carbon black reactor or furnace 110 is supplied with reactant hydrocarbon liquid via conduit 111 and alkali metal, for example, potassium chloride as an aqueous solution, is introduced via conduit 112 into conduit 111 so that the mixture is passed into the precombustion chamber 113 and is surrounded by an annulus of air introduced through conduit 114. Fuel such as natural gas is passed tangentially into precombustion chamber 113 via conduit 115 along with air via conduit 116. The mixture of combustion products, excess air and reactant hydrocarbon pass through reactor section 117 which can have as a portion of the reaction chamber a cylinder or conduit of larger diameter as indicated at 118. The reaction is terminated by water quench admitted via conduit 119 or conduit 119a. The reactor effluent is then passed to a vapor solid separation zone indicated by vessel 121 which can have a filter 122 to separate gas from carbon black. Off gas is removed via stack 123 and the carbon black collected in the bottom of vessel 121 is passed by means of star valve 124 and conduit 125 to cylinder 126. In cylinder 126 the carbon black is agitated with a liquid such as an aqueous solution of nitric acid from storage 127 via conduit 128. The quantity of liquid can be regulated by valve 129 so as to provide the correct quantity of pelleting liquid at all times. The pelleter 126 is actuated by a power source such as motor 131. The wet pellets removed from the pelleter 126 and containing from 40 to 60 weight percent water are passed via conduit 132 to dryer 133. Dryer 133 is a rotating drum enclosed in a furnace 134 and connected at the pellet inlet end to a stationary housing 135 and connected at the pellet exit end to a stationary housing 136. Purge gas is admitted to the interior of the rotating drum by means of a conduit indicated at 137. Purge gas is removed from the housing 135 via conduit 138 by means of pump or fan 139 and is passed through a filtering device 141 with gas being discharged from the top via conduit 142 and carbon black being discharged from the bottom via conduit 143. Combustion gases, not utilized as purge gas, are exhausted via stack. The rotating drum is actuated by a prime mover such as motor 145.

The dryer furnace is fired by fuel admitted to burners 146 via conduit 147 and oxidant, such as air, in conduit 148.

Treated, dried carbon black pellets are removed from stationary housing 136, for example by a moving conveyor belt (not shown).

The following examples will be helpful in achieving a more complete understanding of the invention; however, it should be understood that the examples are illustrative of the invention and should not be used to limit the invention unduly.

EXAMPLE I

The properties of the hydrocarbon feedstocks utilized for preparing the carbon blacks of the examples are shown in Table I below.

TABLE I

| Oil Feedstock | I | II | III |
|---|---|---|---|
| Gravity, °API | 11.0 | 0.3 | 9.8 |
| Vac. Dist.° F. at 760 mm. Hg: | | | |
| First Drop | 470 | | 580 |
| 5% | 558 | 663 | 616 |
| 10% | 587 | 700 | 635 |
| 20% | 611 | 746 | 660 |
| 30% | 639 | 774 | 679 |
| 40% | 660 | 800 | 695 |
| 50% | 681 | 831 | 714 |
| 60% | 711 | 859 | 736 |
| 70% | 761 | 903 | 759 |
| 80% | 820 | 969 | 805 |
| 90% | 867(82%) | | 866 |
| BMCI | 90.4 | | 92 |
| Viscosity, SUS at— | | | |
| 100° F | 81.9 | 1,162 | 91.1 |
| 210° F | 37.6 | 58.6 | 36.7 |
| Carbon, wt. Percent | 88.8 | 89.9 | 89.4 |
| Hydrogen, wt. Percent | 9.5 | 7.9 | 9.5 |
| Sulfur, wt. Percent | 1.29 | 1.94 | 1.18 |
| Carbon Residue, Ramsbottom, wt. Percent | 1.61 | | 2.46 |
| B.S. & W., Vol. Percent | 0.17 | | 0.1 |
| Pour Point, °F | 45 | 40 | 45 |

A low structure HAF furnace carbon black made from feedstock I in the presence of .50 p.p.m. (wt.) of KCl, having an oil absorption value of 0.95 cc. of oil per gram of black and a pH value of 8.7, was subjected to treatment with ozone at various temperatures. Ozonization was carried out in a tube reactor using ozone produced from a commercially available ozonator (Wellsbach Ozonator). In addition to longitudinal flow through the reactor tube, two additional inlets were provided in the reactor tube for introducing the ozone stream tangentially. Twenty parts by weight of carbon black were reacted with 3 parts by weight of ozonized air per minute for a period of 15 minutes for each run. The concentration of ozone in the air stream was varied to obtain different degrees of ozonization at the various temperature levels. Varation of the ozone concentration in the air was accomplished by regulating the output voltage of the ozonator. The reactor tube was insulated and the temperature was measured by an iron-Constantan thermocouple.

The concentration of ozone in the air stream was determined iodometrically. A measured volume of ozonized air was passed through a gas washing bottle containing 2 weight percent potassium iodide (KI) in 0.1 molar potassium dihydrogen phosphate solution $(KH_2PO_4)$ The resulting solution was acidified by the addition of 10 weight percent sulfuric acid and the liberated iodine was titrated with standard sodium thiosulfate solution $(Na_2S_2O_3)$, using starch as the indicator.

The reduction of pH from surface treatment of the carbon black with ozone at various concentrations and temperatures is shown in Table II.

TABLE II

| Run No. | Conc. of $O_3$ (Wt. Percent in Air) | Net $O_3$ Reacted (mg./g. of Black) | pH |
|---|---|---|---|
| Av. Temp., 110° C. | | | |
| 1 | 0.11 | 2.4 | 6.7 |
| 2 | 0.28 | 6.5 | 6.8 |
| 3 | 0.33 | 7.5 | 5.2 |
| 4 | 0.53 | 12.1 | 4.6 |
| 5 | 0.85 | 19.8 | 3.6 |
| 6 | 1.03 | 23.1 | 3.3 |
| 7 | 1.35 | 27.7 | 3.3 |
| Av. Temp., 200° C. | | | |
| 8 | 0.16 | 3.6 | 5.6 |
| 9 | 0.30 | 6.8 | 5.1 |
| 10 | 0.34 | 7.6 | 4.2 |
| 11 | 0.64 | 14.6 | 3.7 |
| 12 | 0.89 | 20.2 | 3.7 |
| Av. Temp., 320° C. | | | |
| 13 | 0.31 | 7.1 | 6.0 |
| 14 | 0.91 | 20.7 | 6.0 |
| Av. Temp., 400° C. | | | |
| 15 | 0.30 | 6.9 | 5.9 |
| 16 | 0.34 | 7.9 | 6.0 |
| 17 | 0.89 | 20.2 | 5.8 |
| Temperature, 420° C. | | | |
| 18 [1] | 0 | 0 | 7.6 |
| Temperature, 395° C. | | | |
| 19 [1] | 0 | 0 | 7.5 |

[1] Treated with air only.

Plots of pH versus the logarithm of the net ozone input for temperature of 110 and 200° C. are shown in FIGURE 7. The plot for runs at room temperature is also shown for comparison.

The data show that the surface treatment with ozone is affected considerably by temperature. The plots at 110 and 200° C. indicate considerable decrease in amount of ozone necessary to reduce pH of carbon black when compared with the runs at room temperature. The decrease is more pronounced at the lower ozone level.

The data in Table II indicate that pH reduction to the desired level can be achieved effectively at the temperature range of 100–200° C. An increase in temperature has an adverse effect on pH reduction. A comparison of runs 5 and 12 with runs 14 and 17 shows that even though the net amount of ozone reacted per gram of black is essentially the same in all cases, the desired pH was obtained only when the runs were made at the lower temperatures. No ozone was present in the air stream in runs 18 and 19. Even though the temperatures were higher than in any of the ozone runs, there was no substantial reduction in pH.

EXAMPLE II

Various physical and chemical properties of the ozonized black from run 10 of Example I and the original low structure black are shown and compared with a commercially obtained channel black in Table III:

TABLE III

|  | Low Structure Furnace Black | Low Structure Furnace Black Ozonized at 200° C. | Channel Black |
|---|---|---|---|
| pH | 8.7 | 4.2 | 4.5 |
| Oil absorption, cc./g | 0.95 | 0.95 | 0.90 |
| Benzene extractable, percent | 0.16 | 0.14 | 0.03 |
| Volatile matter, percent | 1.17 | 1.65 | 5.13 |
| Ash, percent | 0.08 | 0.08 | 0.04 |
| Hydrogen, percent | 0.28 | 0.30 | 0.71 |
| Oxygen, percent | 0.51 | 0.68 | 3.40 |
| Iodine No. (Michelin) | 121 | 113 | 189 |
| DPG absorption, microequiv | 7.1 | 21.3 | 38.7 |
| $NaBH^4$ test, percent $H^2$ uptake | 0.017 | 0.017 | 0.028 |
| $N^2$ surface area, m.²/g | 78 | 74 | 114 |

The data show that ozonization effected a moderate increase in oxygen content and volatile matter. The low pH and high DPG absorption of the ozonized black indicates that the oxygen is incorporated in the form of strongly acidic groups. The treated black maintained its acidity upon degasing in a high vacuum at 150° C. for several hours and the pH was not altered significantly after heat treatment in an air stream at 400° C. for half an hour. These tests indicate the stability of the acidic groups.

EXAMPLE III

The low structure furnace black employed in Examples I and II (hereinafter designated as "A") was subjected to surface ozonization with ozone at 110° C. to give a product with a pH of 2.9, designated as "Treated A." Another low structure black made in the presence of 150 p.p.m. (wt.) of KCl, and having an oil absorption 0.85 cc./g. (hereinafter designated as "B"), was treated with ozone at 100° C. to give a product with a pH of 4.3, designated as "Treated B."

The treated blacks, parent blacks, and a sample of commercial channel black were evaluated in the following compounding recipe using natural rubber:

|  | Parts by weight |
|---|---|
| Natural rubber (#1 Smoked Sheet) | 100 |
| Carbon black | 40 |
| Stearic acid | 3 |
| Zinc oxide | 5 |
| Altax [1] | 0.6 |
| Sulfur | 2.5 |

[1] 2,2'-dibenzothiazyl disulfide.

The stocks were milled, cured 30 minutes at 293° F., and physical properties determined. Results are shown in Table IV:

TABLE IV

|  | Treated A | A | Treated B | B | Channel Black |
|---|---|---|---|---|---|
| Ozonizing temperature, ° C | 110 |  | 100 |  |  |
| pH | 2.9 | 8.7 | 4.3 | 9.7 | 4.0 |
| Compounded ML-4 at 212° F | 67.0 | 67.0 | 78.0 | 73.0 | 71.0 |
| *Physical properties of cured stocks (30 Min.)* | | | | | |
| Cross-link density, $v \times 10^4$, moles/cc | 1.50 | 1.86 | 1.38 | 1.60 | 1.39 |
| 300% modulus, p.s.i | 1,400 | 1,760 | 1,070 | 1,230 | 1,330 |
| Tensile, p.s.i | 4,170 | 4,470 | 4,400 | 4,590 | 4,240 |
| Elongation, percent | 585 | 540 | 640 | 620 | 600 |
| Crescent tear, lb./in. at 200° F | 295 | 270 | 300 | 300 | 325 |

These data show that the ozonized blacks were similar in most respects to channel black. The ozonized blacks imparted lower modulus to the rubber stocks than the parent blacks.

EXAMPLE IV

The two ozonized blacks and the channel black employed in Example III were evaluated in a butadiene/styrene rubber prepared by emulsion polymerization at 122° F. in a fatty acid soap emulsified recipe and coagulated with salt-acid. It has a bound styrene content of 23.5 weight percent and a Mooney value (ML–4 at 212° F.) of 48. The following compounding recipe was employed:

|  | Parts by weight |
|---|---|
| Butadiene/styrene rubber | 100 |
| Carbon black | 40 |
| Zinc oxide | 3 |
| BRT #7 [1] | 6 |
| Sulfur | 1.75 |
| Santocure [2] | 0.8 |

[1] Refined coal-tar product; nontoxic, dark-colored, viscous liquid; sp. gr., 1.20–1.25; Engler specific viscosity at 100° C., 6–9.
[2] N-cyclohexyl-2-benzothiazolesulfenamide.

The stocks were milled, cured 30 minutes at 307° F., and physical properties determined. Results are shown in Table V:

TABLE V

|  | Treated A | Treated B | Channel Black |
|---|---|---|---|
| Ozonizing temperature, ° C | 110 | 100 |  |
| pH | 2.9 | 4.3 | 4.0 |
| Compounded MS-1½ at 212° F | 30.0 | 36.3 | 34.0 |
| *Physical Properties of Cured Stocks (30 min.)* | | | |
| Cross-link density, $v \times 10^4$, moles/cc | 1.58 | 1.50 | 1.43 |
| 300% modulus, p.s.i | 970 | 920 | 770 |
| Tensile, p.s.i | 3,285 | 3,360 | 3,100 |
| Elongation, percent | 610 | 660 | 679 |
| $\Delta T$., ° F | 61.5 | 65.5 | 66.0 |
| Resilience, percent | 61.9 | 57.6 | 59.2 |
| Shore A hardness | 60 | 61 | 61 |
| Abrasion loss, grams | 14.14 | 15.77 | 16.36 |

The stocks in which the ozonized blacks were employed were more resistant to abrasion than the commercial channel black. They had slightly higher tensile strength and lower heat build-up. Differences, however, were not pronounced, the treated blacks being similar in most respects to the channel black.

EXAMPLE V

Pelleted, low structure furnace black (KCl added to feed I) was treated with ozone under conditions similar to treatment of loose or flocculent black in Example I. The pH of the treated pellets was 6.6 and the pH of the black collected on the filter down stream from the vessel containing the pellets, i.e., the fines or smoke, was 2.9. Since there will often be some carbon black fines associated with the carbon black pellets, treatment of the loose black with ozone will give a more uniform product and will utilize the ozone more efficiently.

EXAMPLE VI

Low structure furnace carbon black (Treated B of Example III) was slurried with water as in the wet pelleting process and ozonized air was passed through the slurry for 30 minutes. Ozone consumption was not measured. The pH was reduced only 2 points, i.e., from 9.2 to 7.4.

In another and similar run the ozone consumption was measured. The ozone in the air passed through the slurry amounted to about 12 milligrams of ozone per gram of black and about 7.5 milligrams of ozone per gram of black reacted to produce black with a pH of 7.4. In runs wherein dry carbon black was similarly treated a pH of about 7.4 was reached with only about 5 milligrams of ozone per gram of black. These runs show that ozone treatment of low structure furnace black in the presence of water is unsatisfactory.

EXAMPLE VII

Low structure (KCl added to feed I) furnace carbon black (oil absorption 0.86 cc. oil per gram of black) was ozonized in apparatus such as shown in FIGURE 6. A screw conveyor with variable speed Vickers drive was used instead of the star valve 62 to regulate the flow from a Raymond pulverizer to the fluid transport conduit 66.

The temperature in conduit 66 was 140–150° F. and residence time was 1.6 seconds. The transport air contained 1 weight percent ozone and 1.8 lb. ozone per 100 lbs. black were consumed in producing carbon black having a pH of 3.5. The ratio of transport gas to black was 10 lbs. of transport gas per pound of carbon black.

In the apparatus of FIGURE 6, the ratio of ozone to carbon black is maintained constant or substantially constant by employing the following system. The speed of rotation of the screw conveyor is measured by a tachometer-generator calibrated in terms of pounds per hour of carbon black. The signal proportional to lb./hr. black is then multiplied by the value of the desired ratio of ozone to carbon black in a multiplying circuit to obtain a signal proportional to lb./hr. of ozone required which is then applied as the set point to a lbs. $O_3$/hr. controller (conventional pneumatic or electrical controller). The flow of ozonized air from the ozonizer is measured, analyzed for ozone content and a signal proportional to lbs. $O_3$/hr. produced is fed to the lbs. $O_3$/hr. controller. The signal from the lbs. $O_3$/hr. controller is then applied as the set point to a conventional voltage controller which, by means of a suitable linkage, selects the proper voltage to be supplied to the ozonizer from a voltage source in response to a signal proportional to the voltage being applied to the ozonizer as measured by a voltage meter or a voltage transducer.

EXAMPLE VIII

Furnace carbon black (prepared from feedstock I, oil absorption 1.33, pH 8.3) effluent stream (smoke) was quenched with water and treated with a stream of ozonized oxygen at 152° C. at the rate of 30 milligrams of ozone per gram of carbon black. The treated black had a pH of 5.3 and oil absorption of 1.38. This run shows that ozonization of carbon black smoke upstream from the means for separating the carbon black from the combustion gases and water vapor is not the preferred method of operating because with this ratio of ozone to carbon black the pH of the black should have been reduced to 3 or less. The combustion gases and water vapor apparently compete with the carbon black for the ozone and also prevent proper contact of ozone and carbon black.

EXAMPLE IX

The following are data on tear resistance of natural rubber reinforced with ozonized low structure black. The recipe for the compounds is as follows:

Parts by weight
1 Smoked Sheet ____________________________ 100
Black _______________________________ 50, 65, 85
Zinc Oxide __________________________________ 3
Stearic Acid ________________________________ 2
Flexamine [1] _______________________________ 1
Philrich [2] ______________________________ 5, 10
NOBS Special [3] __________________________ 0.75
Sulfur ______________________________ Variable

[1] Trademark for a diarylamine-ketone reaction product and N,N'-diphenyl-p-phenylenediamine.
[2] Trademark for a highly aromatic oil.
[3] Trademark for N - oxydiethylene-2-benzothiazolesulfenamide.

The sulfur level was adjusted to give approximately equal states of cure at 40 minutes cure time and 307° F. cure temperature for each black loading as determined by swelling in n-heptane.

The quantity measured was the characteristic energy for tearing as determined by the method of Greensmith and Thomas, J. of Polymer Sci. 18, 189 (1955). An Instron tester was used for the measurements. The following Table VI summarizes the results. The grand averages of the tear data, with channel black pegged at 100, are:

TABLE VI
Channel Black _______________________________ 100
Furnace Carbon Black ________________________ 90
Low Structure Furnace Carbon Black __________ 112
Low Structure Furnace Carbon Black, Ozonized ___ 119

The data which form the basis for the summary of Table VI are shown in Table VII:

TABLE VII.—TEAR STRENGTH—NR BLACK STOCKS

| Run No. | Black | Phr. | Sulfur, phr. | $v_r$ | Tear, lbs./in. | | | | | |
|---|---|---|---|---|---|---|---|---|---|---|
| | | | | | 0.1 in./min. | | 1 in./min. | | 10 in./min. | |
| | | | | | RT | 90° C. | RT | 90° C. | RT | 90° C. |
| 1 | Commercial ISAF Black (Furnace Black) | 50 | 2 | 0.292 | 330 | 470 | 330 | 480 | 470 | 430 |
| 2 | do | 65 | 2 | 0.305 | 310 | 480 | 330 | 520 | 410 | 460 |
| 3 | do | 85 | 2 | 0.339 | 270 | 410 | 120 | 490 | 130 | 210 |
| 4 | Easy Processing Channel Black | 50 | 2.27 | 0.296 | 410 | 320 | 270 | 460 | 270 | 410 |
| 5 | do | 65 | 2.40 | 0.310 | 470 | 440 | 380 | 450 | 260 | 700 |
| 6 | do | 85 | 2.35 | 0.325 | 320 | 470 | 340 | 460 | 540 | 390 |
| 7 | Ozonized low structure ISAF Black | 50 | 2.21 | 0.287 | 310 | 510 | 360 | 650 | 400 | 630 |
| 8 | do | 65 | 2.44 | 0.314 | 340 | 680 | 430 | 560 | 330 | 610 |
| 9 | do | 85 | 2.44 | 0.330 | 350 | 530 | 410 | 550 | 520 | 570 |
| 10 | Low structure ISAF Black | 50 | 2.15 | 0.293 | 430 | 560 | 300 | 640 | 340 | 550 |
| 11 | do | 65 | 2.32 | 0.320 | 340 | 410 | 380 | 590 | 390 | 540 |
| 12 | do | 85 | 2.42 | 0.338 | 410 | 600 | 410 | 530 | 340 | 530 |

EXAMPLE X

HAF (High Abrasion Furnace) furnace blacks were made under similar HAF operating conditions with and without an alkali metal (KCl) in the feed and with and without nitric acid ($HNO_3$) in the pelleting fluid (water). Feedstock II was used as the reactant hydrocarbon. The wet pellets contained about 60 weight percent carbon black and about 40 weight percent water. The temperature of the wet pellets exiting the pelleter was about 93° C. and the temperature of the pellets exiting the dryer was about 205 to 210° C. Properties of these blacks are shown and compared to channel black in the following Table VIII.

TABLE VIII

| Carbon Black (HAF) | A[1] | B | C | D | EPC[2] |
|---|---|---|---|---|---|
| KCl, p.p.m. by wt | | 130 | 130 | 200 | |
| $HNO_3$, wt. percent | | | 5 | 5.5 | |
| Surface Area, m²/g | 79 | 77 | 80 | 85 | 114 |
| Oil Absorption, cc./g | 1.10 | 0.90 | 0.8 | 0.93 | 0.89 |
| pH | 7.4 | 7.3 | 2.8 | 2.5 | 4.7 |
| DPG Absorption, micro. eq./g | 20.1 | 15.3 | 49.7 | 61 | 44 |
| Volatiles, wt. percent | | 1.24 | 2.61 | 2.5 | 4.59 |

[1] Industry Reference Black (IRB #1).
[2] Easy Processing Channel Black.

The carbon blacks of Table VIII were compounded in natural rubber and tested. The compounding recipe is shown in Table IX.

TABLE IX

| | Parts by weight |
|---|---|
| No. 1 Smoked Sheet | 100 |
| Carbon black | 50 |
| Stearic Acid | 3 |
| Benzothiazyl Disulfide | 0.6 |
| Sulfur | 2.5 |

The results of tests are shown in Table X.

TABLE X

| Carbon Black | A | B | C | D | EPC |
|---|---|---|---|---|---|
| Compounded ML-4 at 212° F | 80 | 73.2 | 78.4 | 78 | 84.8 |
| Scorch at 280° F., min. to 5 pt. rise | 4.4 | 5.6 | 7.3 | 8 | 7.1 |
| Scorch at 250° F., min. to 5 pt. rise | 9.2 | 12 | 17.6 | 19.9 | 16.4 |

Physical properties (cured at 293° F. for 30 min.)

| | | | | | |
|---|---|---|---|---|---|
| Cross-link Density, $\nu \times 10^4$ mol/cc | 1.98 | 1.76 | 1.54 | 1.64 | 1.54 |
| 300% Modulus, p.s.i | 2,370 | 1,770 | 1,670 | 1,765 | 1,730 |
| Tensile, p.s.i | 3,825 | 3,925 | 3,645 | 3,815 | 4,115 |
| Elongation, percent | 455 | 530 | 515 | 525 | 550 |

The acid treated, low structure carbon blacks of Table VIII, i.e., Blacks C and D, were compounded in styrene-butadiene rubber (SBR) and compared to such rubber containing channel black (EPC). The recipe is shown in Table XI.

TABLE XI

| | Parts by weight |
|---|---|
| SBR | 100 |
| Carbon Black | 40 |
| Zinc Oxide | 3 |
| Coal Tar | 6 |
| Sulfur | 1.75 |
| N-Cyclohexyl Benzothiazole Sulfenamide | 1 |

The results of tests on the rubber samples are shown in Table XII.

TABLE XII

| Carbon Black | C | D | EPC |
|---|---|---|---|
| Compounded ML-4 at 212° F | 41 | 43 | 44 |
| Scorch at 280° F., min. to 5 pt. rise | 15.9 | 16.3 | 16.1 |

Physical properties (30 min. cure at 307° F.)

| | | | |
|---|---|---|---|
| Cross-link density, $\nu \times 10^4$ mol/cc | 1.80 | 1.70 | 1.53 |
| Compression set, percent | 30 | 37 | 38.1 |
| 300% Modulus, p.s.i | 1,035 | 985 | 815 |
| Tensile, p.s.i | 2,990 | 2,710 | 3,360 |
| Elongation, percent | 575 | 580 | 680 |
| $\Delta T.$, °F | 55.5 | 61.2 | 64.2 |
| Resilience, percent | 70.2 | 67.8 | 64.5 |
| Abrasion Loss, g | 15.31 | 15.91 | 16.10 |
| Abrasion Rating | 105 | 100 | 100 |

EXAMPLE XI

An ISAF (Intermediate Super Abrasion Furnace) furnace black was made in the presence of an alkali metal (KCl) using Feedstock III as the reactant hydrocarbon. A portion of the ISAF carbon black was pelleted with $HNO_3$ in the pelleting water at conditions described in Example X. Properties of these blacks are shown and compared to channel black in the following Table XIII.

TABLE XIII

| Carbon Black (ISAF) | E | F | EPC |
|---|---|---|---|
| KCl, p.p.m. by wt | 50 | 50 | |
| $HNO_3$, wt. percent | | 5.5 | |
| Surface Area, m.²/g | 108 | 119 | 114 |
| Oil Absorption, cc./g | 0.96 | 0.93 | 0.89 |
| pH | | 5.6 | 4.7 |
| DPG Absorption, micro. eq./gm | | 45 | 44 |
| Volatiles, wt. percent | | | 4.59 |

The carbon blacks of Table XIII were compounded in natural rubber according to the recipe of Table IX and tested. Results of tests are shown in Table XIV.

TABLE XIV

| Carbon Black | E | F | EPC |
|---|---|---|---|
| Compounded MS-4 at 212° F | 39.8 | 45.2 | 43.5 |
| Scorch at 250° F., min. to 5 pt. rise | 10.5 | 15.9 | 16.0 |

Physical properties (30 min. cure at 293° F.)

| | | | |
|---|---|---|---|
| Cross-link density, $\nu \times 10^4$ mol/cc | 1.74 | 1.54 | 1.50 |
| 300% Modulus, p.s.i | 1,775 | 1,560 | 1,660 |
| Tensile, p.s.i | 4,265 | 3,715 | 4,040 |
| Elongation, percent | 540 | 520 | 555 |

The carbon blacks of Table XIII were compounded in styrene-butadiene rubber according to the recipe of Table XI and tested. Results of tests are shown in Table XV.

TABLE XV

| Carbon Black | E | F | EPC |
|---|---|---|---|
| Compounded ML-4 at 212° F | 47.0 | 50.6 | 44.8 |
| Scorch, 280° F., min. to 5 pt. rise | 10.4 | 15.2 | 16.5 |

Physical properties (30 min. cure at 307° F.)

| | | | |
|---|---|---|---|
| Cross-linked density, $\nu \times 10^4$ mols/cc | 1.53 | 1.70 | 1.64 |
| Compression set, percent | 23.2 | 27.5 | 30.2 |
| 300% Modulus, p.s.i | 875 | 1,040 | 920 |
| Tensile, p.s.i | 3,880 | 3,520 | 3,440 |
| Elongation, percent | 680 | 590 | 670 |
| $\Delta T.$, °F | 69.0 | 63.8 | 64.0 |
| Resilience, percent | 60.9 | 64.3 | 63.3 |
| Abrasion Loss, g | 12.40 | 14.37 | 16.64 |
| Abrasion Rating | 108 | 93 | 80 |

Other tests have shown the nitric acid threated, low structure, oil furnace black to be the substantial equivalent of channel black in both physical and chemical properties. The acidic complexes of the nitric acid treated blacks are quite stable. Degassing in a high vacuum for 90 minutes at 105° C. or 24 hours water extraction in Soxhlet extractors have been found to produce no significant changes. Evacuation at temperatures in excess of 200° C. results in loss of $CO_2$ with accompanying loss in acidity. This process occurs in a pattern very similar to that observed with channel black.

The close similarity of nitric acid treated black and channel black in surface chemistry is reflected in the vulcanization characteristics imparted to the natural rubber and SBR rubber of the examples.

The tinting strengths of nitric acid treated black and channel black are substantially equal in all concentrations tested. Nitric acid treated, low structure oil furnace black appears to be an acceptable substitute or replacement for channel black in all applications.

That which is claimed is:

1. A process for producing a furnace carbon black having properties approximating those of channel carbon black with respect to pH, structure and modulus which process comprises:

charging a hydrocarbon feedstock to a carbon black-producing furnace operated under conditions to produce carbon black having an oil absorption value of not more than about 1 recovering carbon black from the furnace effluent gases;

contacting the carbon black from said furnace with an amount of nitric acid sufficient to reduce the pH of the carbon black to a value in the range of about 2 to 5; adding about 40 to 60 weight percent pelleting water to the carbon black; pelleting the carbon black in a pelleting step; drying the pelleted black at a temperature of about 150° C. to 210° C.; and recovering the carbon black so produced.

2. The process of claim 1 wherein the carbon black is produced in the presence of about 200 p.p.m. of potassium and is contacted with about 5 weight percent of nitric acid.

3. The process of claim 2 wherein the acid is added to the pelleting water in the pelleting step.

4. A process for producing a furnace carbon black having properties approximating those of channel black which process comprises:

charging a hydrocarbon feedstock containing at least about 1 p.p.m. by weight of an alkali metal having an atomic number of at least 19 to a carbon black furnace under carbon black-producing conditions having an oil absorption value of not more than about 1;

recovering carbon black from effluent gases; and contacting said carbon black with an amount of nitric acid sufficient to reduce the pH of the carbon black to a value of not more than about 5.

5. The process of claim 4 wherein the carbon black is contacted with about 40 to 60 weight percent water containing about 6 to 9 weight percent of nitric acid at a temperature in the range of about atmospheric to 95° C. and is then dried at a temperature in the range of about 150 to 210° C.

References Cited by the Examiner

UNITED STATES PATENTS

| | | | |
|---|---|---|---|
| 2,657,117 | 10/1953 | Sperberg | 23—209.9 X |
| 2,682,448 | 6/1954 | Cines | 23—209.1 |
| 2,835,562 | 5/1958 | Boyer et al. | 23—259.5 X |
| 2,984,547 | 5/1961 | Antonsen | 23—209.1 |
| 3,010,794 | 11/1961 | Friauf et al. | 23—209.4 |
| 3,023,118 | 2/1962 | Donnet | 106—307 |

OSCAR R. VERTIZ, *Primary Examiner.*

MAURICE A. BRINDISI, BENJAMIN HENKIN,
*Examiners.*

E. J. MEROS, *Assistant Examiner.*